INVENTORS
HELMUT SEUFERT
DONALD L. COLBENSON
BY
*Richard D. Law*
ATTORNEY

United States Patent Office 3,401,919
Patented Sept. 17, 1968

3,401,919
REMOTE CONTROLLED VEHICLE
CARBURETOR CHOKE
Helmut Seufert, Salina Star Rte., and Donald L. Colbenson, 2693 4th St., both of Boulder, Colo. 80302
Filed Nov. 28, 1966, Ser. No. 597,445
5 Claims. (Cl. 261—64)

This invention relates to a remote controlled vehicle carburetor choke for selectively adjusting the control valve for an air inlet to a vehicle engine carburetor.

The majority of modern vehicles are provided with an automatic choke on the carburetor of the engine of the vehicle, replacing the manually controlled choke, which had for years been used on the carburetors of automobile engines. The operation of automatic chokes leaves much to be desired for most vehicles, particularly in cold climates where starting the vehicle engine is difficult, at best. Efficient and effective control of the carburetor is, therefore, achieved only by the use of a manual control of the air inlet valve to the carburetor, which provides a means for starting as well as operating the engine of the vehicle. One of the chief difficulties with commonly used automatic chokes is that they are either on or off, with no intermediate positions of control. Thus, while control is needed in starting a cold engine, the automatic choke, when it is operating, is either full off or full on. When the automatic choke is not working, starting of the cold engine is virtually impossible.

In some vehicles a direct mechanical link, usually in the form of a push-pull rod, extending from the carburetor to the vehicle driver's compartment may be adequately used to provide a manual choke for the control of the air intake valve of the carburetor. In many vehicles, however, a direct link between the carburetor and a position easily accessible to the driver is not possible, and prior workers have used different means to provide a controllable choke. Several such chokes include only an on and off mechanism which is controllable by the driver. Since such devices have only an on and off position, they are not much better than an automatic choke, as no intermediate positions are provided for controlling the air inlet to the carburetor during the engine warm up period.

According to the present invention, we have provided a controllable choke which does not require a mechanical linkage between the driver's compartment and the carburetor of the vehicle, but which provides positive control of the carburetor through a series of positions for permitting partial choking of the carburetor for operating the engine under various conditions. The invention provides an electromagnetic control for operating the air inlet control valve of the carburetor, using a selector switch in the driver's compartment, and providing positive control of the choking of the engine during starting and operation thereof.

It is, therefore, an object of the present invention to provide a remote control choke mechanism for an automobile vehicle engine carburetor which does not require a direct mechanical linkage to the carburetor.

Another object of the invention is to provide an automatic choke control for an existing air inlet control valve of a carburetor for a vehicle engine essentially without modification.

A still further object of the invention is to provide an electromagnetic choke control for the air inlet control valve of an engine carburetor providing positive control of such a valve through the range of full open to full closed.

These and other objects and advantages of the invention may be readily ascertained by referring to the following description and appended illustrations in which.

Figure 1:
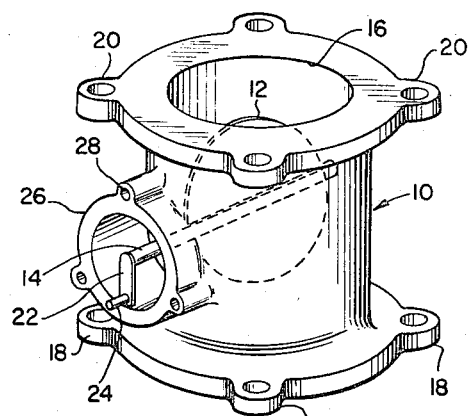
FIG. 1 is a perspective view of one form of a control valve for the air inlet to a carburetor on which the invention may be utilized.

In one form of the invention an electromagnetic means is provided for controlling the position of the choke valve or the air inlet valve to an engine carburetor, using a manual remote control switch for positioning the choke in the desired position. A selective position, controllable armature may, also, be used for controlling the air inlet valve of a carburetor. A simple form of the invention is to provide a series of electromagnets which may be selectively engaged so as to selectively position a magnetic follower, which follower is connected to the air inlet valve for a carburetor, thereby selectively positioning the valve for the carburetor.

In the form of the invention illustrated, a tubular body 10 illustrates the air inlet throat to a carburetor provided with a butterfly valve 12 mounted on a shaft 14 which permits the same to rotate and close the air inlet opening 16 to the carburetor. It will be recognized that this particular unit is a specialized device for fitting a not commonly used carburetor. However, the functions and the parts are found in substantially all carburetors, that is, each carburetor must have an air inlet tube equivalent to the opening 16. Most carburetors have an air inlet control valve equivalent to the butterfly valve 12, and such valve is mounted on a shaft which permits rotation of the valve to open and close the air inlet. In many carburetors the inlet port and the butterfly valve or other control means is built into the carburetor, and the present invention is applicable to all such carburetors which have valve means rotatable to open and close the air inlet throat to a carburetor.

In the present form, the tubular member 10 is provided with ears 18 having a bolt hole therethrough for attachment to a carburetor or the like, and at the opposite end has ears 20 having a bolt hole therein, providing means for holding an air cleaner or the like on the inlet throat. The butterfly valve shaft 14 is provided with a crank arm 22 and a link 24 in generally axial alignment with the shaft 14. In some carburetors this is standard, since it provides a lever arm for rotating the shaft and the movement of the valve 12.

Figure 2:
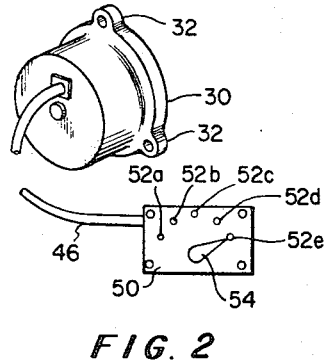
FIG. 2 is a perspective view of an attachment, according to the invention, including a selector switch for fitting on the control valve of the air inlet to a carburetor.
Figure 3:
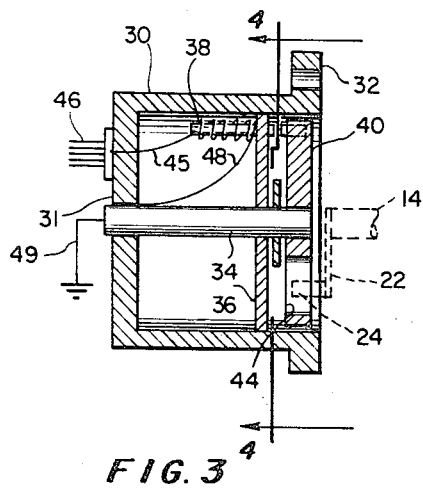
FIG. 3 is a cross-sectional view of a control mechanism, according to the invention, for the air inlet valve to a carburetor.
Figure 4:
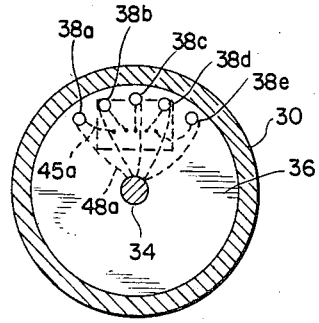
FIG. 4 is a cross-sectional view of the control mechanism of FIG. 3, taken along section line 4—4.
Figure 5:
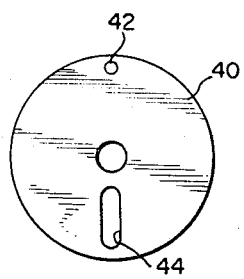
FIG. 5 is one form of a connector for the crank arm of a control valve for the air inlet of a carburetor.
Figure 6:
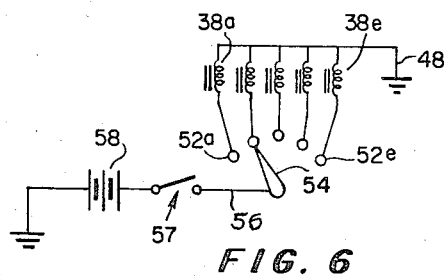
FIG. 6 is a circuit diagram for one form of a control mechanism for the air inlet valve of a carburetor.

One form of control means, illustrated in FIG. 2, includes a housing 30 provided with ears 32 having bolt holes therein arranged to be mounted on a boss 26 on the body 10 which has mating bolt holes 28. Mounted in the housing 30 is a shaft 34 (FIG. 3) secured to the end of the housing 30 and held by an aligning disc 36 fitted in the housing. A plurality of solenoids or electromagnets 38 are mounted on the disc in an arcuate position, as shown in FIG. 4 wherein the solenoids 38a through 38e are mounted in an arcuate path around the disc 36. A rotary member 40 is rotatably mounted on the shaft 34, and the disc 40 includes a paramagnetic insert 42 and an elongated slot 44. The member 40 may be rigidly attached to shaft 34 which may be rotatably mounted in the housing. With the housing 30 mounted on the boss 26, the disc 40 mounted on the shaft 34 has the slot 44 fitted over the crank arm 24 which is attached to the shaft 14, and thus provides means for turning the shaft 14 to control the valve 12. Each solenoid includes a hot lead 45 from a control cable 46, and a ground lead 48 attached to the shaft 34 (for convenience) which is grounded at 49. The hot leads to the solenoids 38 are bundled into the main cable 46 and each terminates at a position in a selector switch 50 which is mounted on the dashboard within easy reach of the driver. The selector switch includes positions 52a through 52e which correspond to the solenoids 38a through 38e, respectively and the selector pointer 54 determines which solenoid is energized. As shown in the circuit diagram 6, a hot lead 56 is connected to the vehicle ignition switch 57, providing an on-off switch for the automobile battery 58 for energizing the solenoids only when the ignition switch is turned on. The positioning of the solenoids in the housing should be arranged so as to control the butterfly valve from full open to full closed, with several intermediate positions, determined by the number of intermediate positions desired for the unit.

For using the choke of the invention, the ignition switch 57 is turned on, which provides for energizing the hot lines to the solenoids. The selector switch 54 is turned to the position desired, normally to full closed on starting, and then stepwise back down to full open as the engine warms and runs smoother. It is seen that any desired position may be maintained for the necessary period of time to permit the engine to operate without any choking.

Other means may be provided for moving the crank arm, for example, an armature controlled by a switch in the driver's compartment to provide an infinite number of positions from full closed to full open of the butterfly valve of the carburetor. Likewise, other electromagnetic means may be provided for the movement of a follower mounted on the crank arm of the valve for positioning the valve to the desired condition of air passage for the operation of the engine. Additionally, the magnetic follower may be directly mounted on the air inlet valve shaft and a series of electromagnets, armature or the like positioned to rotate the follower.

While the invention has been illustrated by reference to the particular embodiments, there is no intent to limit the spirit or the scope of the invention to the precise details so set forth except as defined in the following claims.

We claim:

1. A control for an air inlet valve of the carburetor of an internal combustion engine comprising a housing mountable on the carburetor of an internal combustion engine; lever means arranged to be associated with the shaft of the air inlet valve of such a carburetor and to rotate the same for opening and closing the air inlet; electromagnetic means mounted in said housing arranged to apply a magnetic effect at a series of preselected positions; a magnetic follower mounted on said lever arranged to be moved sequentially through said preselected positions under the influence of said electromagnetic means and thereby rotate the shaft of the air inlet valve; and means for selectively activating at least a portion of said electromagnetic means to apply said magnetic effect through said series of preselected positions which correspond to full closed to full open positions of the air inlet valve of the carburetor.

2. A control according to claim 1 wherein said electromagnetic means is a series of solenoids mounted in said housing in position to move said follower through said series of preselected positions.

3. A control according to claim 2 wherein said means for selectively activating at least a portion of electromagnetic means is a multiple position selector switch for individually and sequentially activating said solenoids.

4. A control according to claim 1 wherein said follower is mounted on a rotary member and said rotary member is associated with a shaft of the valve for the air inlet of the carburetor.

5. A control according to claim 4 wherein said rotary member is a rotary disc arranged to mount over a crank arm mounted on the shaft of the valve for the air inlet of said carburetor.

References Cited

UNITED STATES PATENTS

| | | | |
|---|---|---|---|
| 1,527,579 | 2/1925 | Sturdevant | 251—137 |
| 2,121,392 | 6/1938 | Ashworth. | |
| 2,842,334 | 7/1958 | Short | 251—137 |
| 3,329,411 | 7/1967 | Offner | 261—64 X |

HARRY B. THORNTON, *Primary Examiner.*

TIM R. MILES, *Assistant Examiner.*